(12) United States Patent
Jiang et al.

(10) Patent No.: US 8,082,814 B2
(45) Date of Patent: Dec. 27, 2011

(54) BALL SCREW DEVICE HAVING LUBRICATING DEVICE

(75) Inventors: Zong Sian Jiang, Taichung (TW); Xin He Chen, Taichung (TW); Wuteng Hsieh, Taichung (TW)

(73) Assignee: Hiwin Technologies Corp., Situn Taichung (TW)

( * ) Notice: Subject to any disclaimer, the term of this patent is extended or adjusted under 35 U.S.C. 154(b) by 811 days.

(21) Appl. No.: 12/214,193

(22) Filed: Jun. 17, 2008

(65) Prior Publication Data

US 2009/0308690 A1 Dec. 17, 2009

(51) Int. Cl.
F16H 3/06 (2006.01)
F16H 27/02 (2006.01)
F16H 29/02 (2006.01)
F16H 29/20 (2006.01)

(52) U.S. Cl. ............ 74/89.44; 74/89.43; 184/5; 184/7.1; 184/7.4; 184/100

(58) Field of Classification Search ................ 184/5, 25, 184/7.1, 7.4, 9, 99, 100; 74/89.44, 89.43
See application file for complete search history.

(56) References Cited

U.S. PATENT DOCUMENTS

| | | | | | |
|---|---|---|---|---|---|
| 888,619 | A | * | 5/1908 | Kelly | 74/89.44 |
| 1,828,317 | A | * | 10/1931 | Clapp | 222/108 |
| 2,403,092 | A | * | 7/1946 | Lear | 74/89.26 |
| 2,708,374 | A | * | 5/1955 | Engh | 74/89.44 |
| 2,818,745 | A | * | 1/1958 | Spontelli | 74/89.4 |
| 3,116,931 | A | * | 1/1964 | Edwards | 277/354 |
| 3,532,004 | A | * | 10/1970 | Nilsson | 74/424.87 |
| 3,643,521 | A | * | 2/1972 | Nilsson | 74/89.4 |
| 3,858,458 | A | * | 1/1975 | Hunter | 74/606 R |
| 4,053,167 | A | * | 10/1977 | Jelinek | 277/354 |
| 4,150,835 | A | * | 4/1979 | Wheelock | 277/354 |
| 4,173,330 | A | * | 11/1979 | Goldschmidt et al. | 254/98 |
| 4,557,156 | A | * | 12/1985 | Teramachi | 74/424.86 |
| 4,795,172 | A | * | 1/1989 | Brande | 277/354 |
| 4,939,946 | A | * | 7/1990 | Teramachi | 74/89.3 |
| 5,188,374 | A | * | 2/1993 | Gorman | 277/500 |
| 5,207,794 | A | * | 5/1993 | Erdal | 277/346 |
| 5,228,353 | A | * | 7/1993 | Katahira et al. | 74/89.3 |
| 5,454,278 | A | * | 10/1995 | Kasuga | 74/89.33 |
| 5,555,771 | A | * | 9/1996 | Kuroiwa et al. | 74/89.4 |
| 5,582,072 | A | * | 12/1996 | Yamaguchi et al. | 74/441 |
| 5,749,266 | A | * | 5/1998 | Tsukada | 74/89.44 |
| 5,809,838 | A | * | 9/1998 | Miyaguchi et al. | 74/89.44 |
| 5,906,136 | A | * | 5/1999 | Yabe et al. | 74/424.72 |
| 6,023,991 | A | * | 2/2000 | Yabe et al. | 74/89.44 |
| 6,125,968 | A | * | 10/2000 | Shirai | 184/5 |
| 6,216,821 | B1 | * | 4/2001 | Namimatsu et al. | 184/99 |
| 6,220,110 | B1 | * | 4/2001 | Yang et al. | 74/424.87 |

(Continued)

*Primary Examiner* — Michael Mansen
*Assistant Examiner* — Henry Liu
(74) *Attorney, Agent, or Firm* — Charles E. Baxley

(57) ABSTRACT

A ball screw device includes a ball nut rotatably engaged onto a screw shaft for forming a gap between the ball nut and the screw shaft and for receiving a lubricating oil and for forming a helical raceway between the ball nut and the screw shaft, a number of bearing members engaged between the ball nut and the screw shaft and in the helical raceway, and a forcing device includes a barrel having an outer helical member for forming a helical channel and for receiving the lubricating oil, and for forcing the lubricating oil to flow into the gap between the ball nut and the screw shaft and to effectively lubricate the bearing members when the barrel is rotated relative to the screw shaft.

7 Claims, 4 Drawing Sheets

U.S. PATENT DOCUMENTS

| | | | |
|---|---|---|---|
| 6,247,556 B1 * | 6/2001 | Chen | 184/83 |
| 6,364,058 B1 * | 4/2002 | Nishide et al. | 184/5 |
| 6,450,295 B1 * | 9/2002 | Tsukada et al. | 184/5 |
| 6,568,508 B2 * | 5/2003 | West et al. | 184/5 |
| 6,619,148 B2 * | 9/2003 | Nishide | 74/89.44 |
| 6,634,246 B2 * | 10/2003 | Ohya et al. | 74/89.44 |
| 6,691,837 B1 * | 2/2004 | Kapaan et al. | 188/72.1 |
| 6,711,963 B2 * | 3/2004 | Yabe | 74/89.44 |
| 6,732,600 B2 * | 5/2004 | Greubel | 74/89.44 |
| 6,752,245 B2 * | 6/2004 | Tsukada et al. | 184/5 |
| 6,817,260 B2 * | 11/2004 | Liao | 74/89.43 |
| 6,865,963 B2 * | 3/2005 | Takanohashi et al. | 74/89.44 |
| 6,880,676 B2 * | 4/2005 | Tsukada et al. | 184/5 |
| 7,000,493 B2 * | 2/2006 | Fujita et al. | 74/89.44 |
| 7,237,652 B2 * | 7/2007 | Takanohashi et al. | 184/6.12 |
| 7,278,333 B2 * | 10/2007 | Kato et al. | 74/89.44 |
| 7,430,933 B2 * | 10/2008 | Yatsushiro et al. | 74/89.4 |
| 7,543,514 B2 * | 6/2009 | Hwang et al. | 74/89.44 |
| 7,543,684 B2 * | 6/2009 | Chin-Pei et al. | 184/5 |
| 7,634,952 B2 * | 12/2009 | Chen et al. | 74/89.44 |
| 7,650,806 B2 * | 1/2010 | Tsukada et al. | 74/89.44 |
| 7,857,100 B2 * | 12/2010 | Sakurai | 184/5 |
| 2004/0007426 A1 * | 1/2004 | Keller et al. | 184/5 |
| 2006/0051005 A1 * | 3/2006 | Schott | 384/462 |

* cited by examiner

BALL SCREW DEVICE HAVING LUBRICATING DEVICE

BACKGROUND OF THE INVENTION

1. Field of the Invention

The present invention relates to a ball screw device, and more particularly to a ball screw device having a lubricating device for effectively and easily lubricating the balls or the bearing members, and for facilitating the rotational movement of the ball nut and the screw shaft relative to each other in great rotational speeds.

2. Description of the Prior Art

Typical ball screw devices comprise a ball nut rotatably and/or moveably engaged onto a screw shaft, and normally arranged to allow the ball nut to be rotated and/or moved relative to the screw shaft in great rotational speeds. For allowing the ball nut to be smoothly rotated and moved relative to the screw shaft, a suitable bearing device or lubricating structure is further required to be provided and engaged between the ball nut and the screw shaft, for facilitating the rotational movement between the ball nut and the screw shaft.

For example, U.S. Pat. No. 5,809,838 to Miyaguchi et al. discloses one of the typical ball screw devices including an oil supplying structure having oil supplying holes formed in the ball nut and the outer ball race for supplying oil even when the typical ball screw device is in operation, and for eliminating the mounting and removal of the oil supplying pipes when supplying the oil. For lubricating the typical ball screw device, an annular gap will be formed between the ball nut and the outer ball race for filling and retaining the oil in the outer ball race.

However, the oil is simply filled into the annular gap of the outer ball race, but may not be forced into the endless ball train guiding passage of the ball nut that is provided for receiving the balls or bearing devices.

U.S. Pat. No. 6,364,058 to Nishide et al., and U.S. Pat. No. 6,732,600 to Greubel disclose two further typical ball screw devices including a ring chamber formed or arranged between an outer bearing part and an inner bearing part for receiving the lubricating oil.

However, similarly, the oil is simply filled into and retained in the ring chamber that is provided between the outer bearing part and the inner bearing part, but may not be forced into the moving path that is formed between a threaded spindle and a threaded nut and that is provided for receiving a roller bearing or balls.

The present invention has arisen to mitigate and/or obviate the afore-described disadvantages of the conventional ball screw devices for such as machine tools or the like.

SUMMARY OF THE INVENTION

The primary objective of the present invention is to provide a ball screw device including a lubricating device or structure for effectively and easily lubricating the balls or the bearing members, and for facilitating the rotational movement of the ball nut and the screw shaft relative to each other in great rotational speeds.

In accordance with one aspect of the invention, there is provided a ball screw device comprising a screw shaft including an outer thread formed thereon, a ball nut including a bore formed therein for receiving the screw shaft and for forming a first gap between the ball nut and the screw shaft and for receiving a lubricating oil, and including an inner thread formed in the ball nut and aligned with the outer thread of the screw shaft for forming a helical raceway between the ball nut and the screw shaft, a number of bearing members engaged in the helical raceway that is formed between the ball nut and the screw shaft for facilitating a movement between the ball nut and the screw shaft, and a forcing device for forcing the lubricating oil to flow into the first gap that is formed between the screw shaft and the ball nut and to lubricate the bearing members.

The forcing device includes a barrel attached to the ball nut and moved in concert with the ball nut, for forming a second gap between the barrel and the screw shaft and for communicating with the first gap formed between the ball nut and the screw shaft, the barrel includes at least one aperture formed therein and communicating with the second gap formed between the barrel and the screw shaft for allowing the lubricating oil to flow into the second gap formed between the barrel and the screw shaft and the first gap formed between the ball nut and the screw shaft.

The barrel includes a helical member formed on an outer peripheral portion for forming a helical channel and for receiving the lubricating oil, the aperture is communicating with the helical channel of the barrel.

A receptacle is further provided and rotatably engaged onto the barrel for closing the helical channel of the barrel and for retaining the lubricating oil within the helical channel of the barrel.

A bearing housing is further provided and rotatably engaged onto the ball nut and attached to the receptacle, and a number of rolling elements are engaged between the ball nut and the bearing housing for facilitating a rotating movement between the ball nut and the bearing housing.

The barrel includes a spacer for engaging with the receptacle and for forming an annular space between the receptacle and the barrel, and the barrel includes an entrance communicating with the annular space and the helical channel of the barrel.

The receptacle includes a peripheral fence extended therefrom for forming the annular space between the peripheral fence of the receptacle and the barrel, and for forming an opening in the peripheral fence.

The receptacle includes an orifice formed in the peripheral fence for attaching a grease nipple and for filling the lubricating oil into the receptacle. The barrel includes a peripheral member extended therefrom for rotatably engaging into the opening of the receptacle.

A ball screw seal is further provided and attached to the barrel and engaged with the outer thread of the screw shaft for making a fluid tight seal between the barrel and the screw shaft. Another ball screw seal is further provided and attached to the ball nut and engaged with the outer thread of the screw shaft for making a fluid tight seal between the ball nut and the screw shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
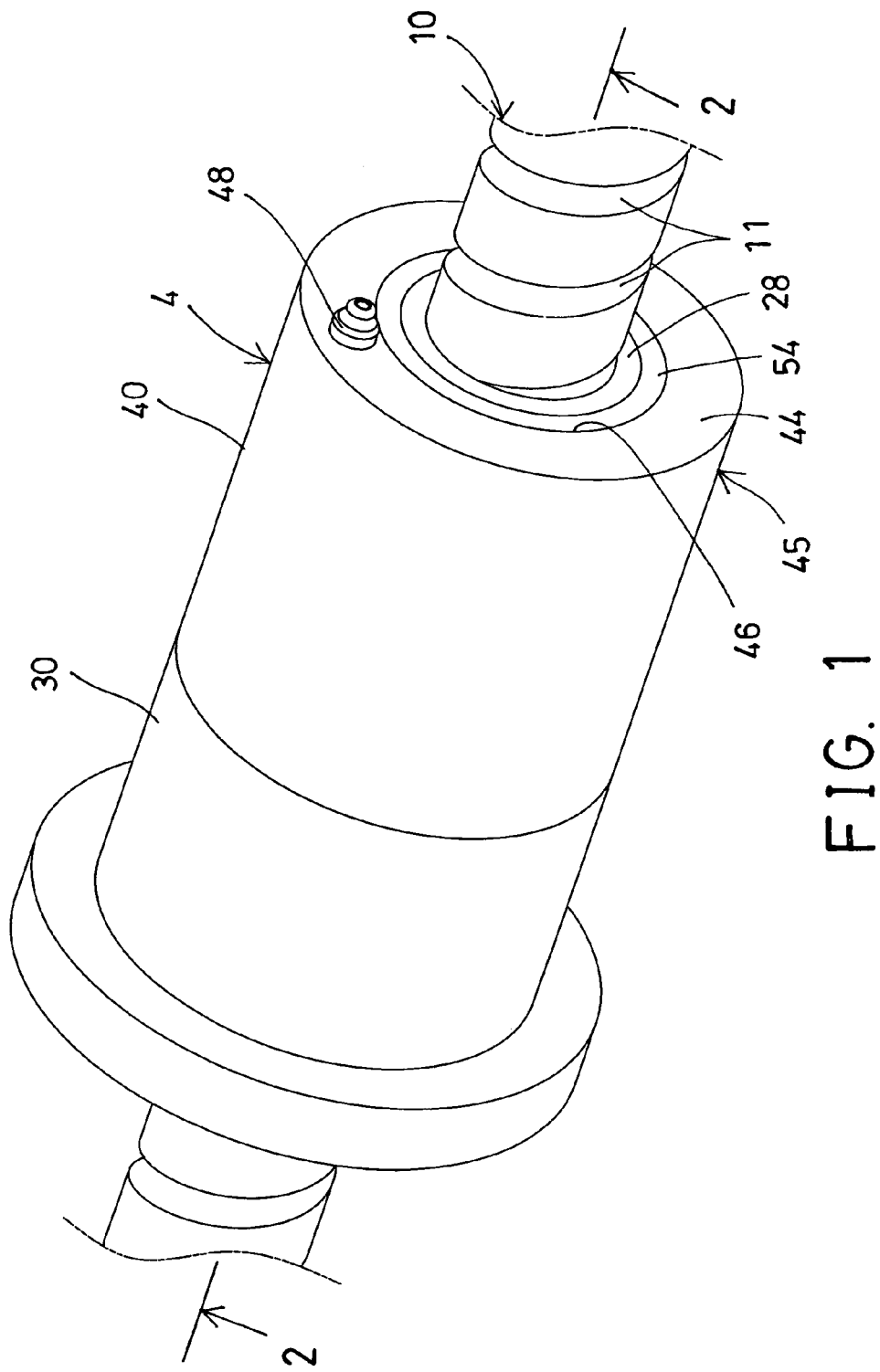
FIG. 1 is a partial perspective view of a ball screw device in accordance with the present invention.
Figure 2:
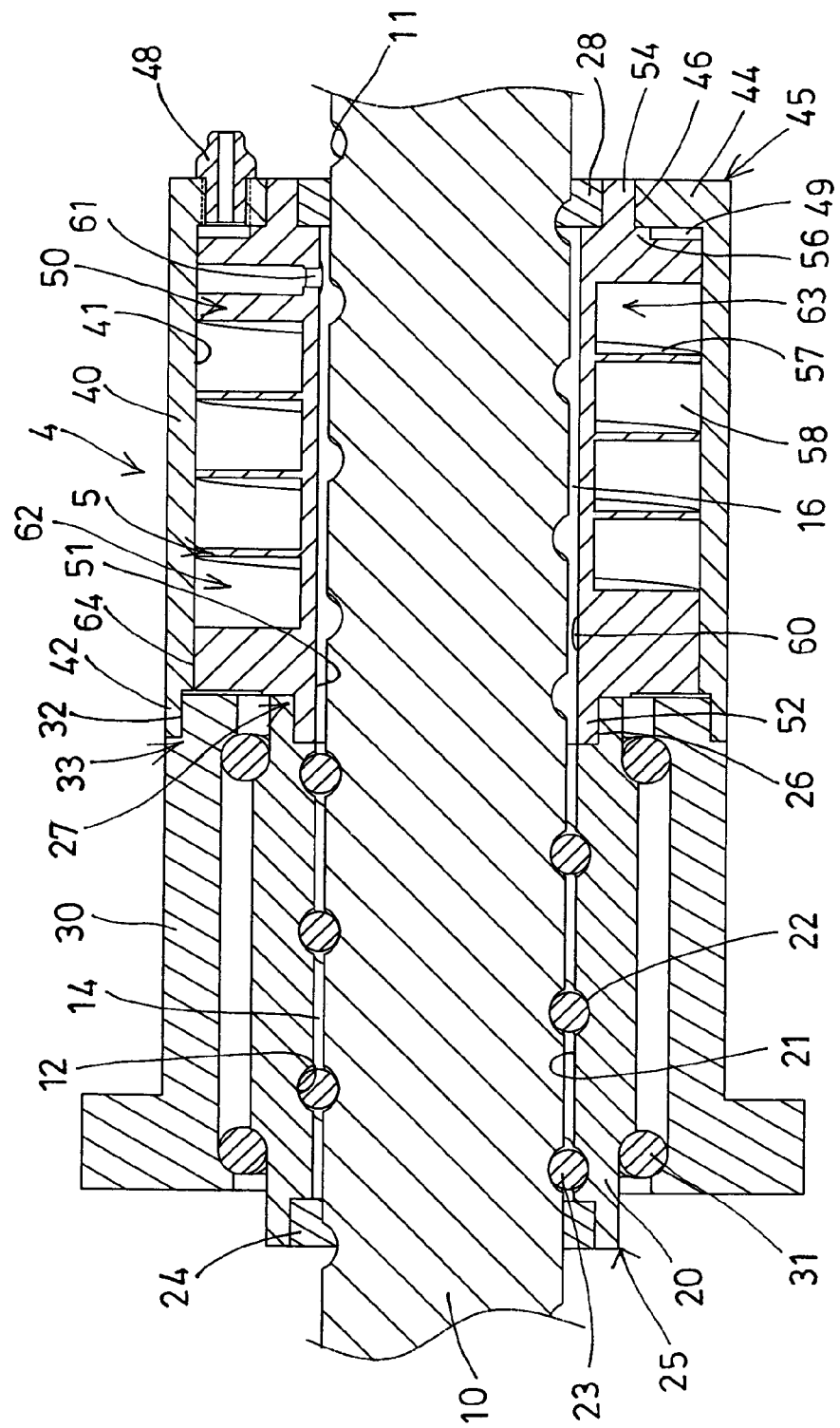
FIG. 2 is a partial cross sectional view of the ball screw device taken along lines 2-2 of FIG. 1.
Figure 3:
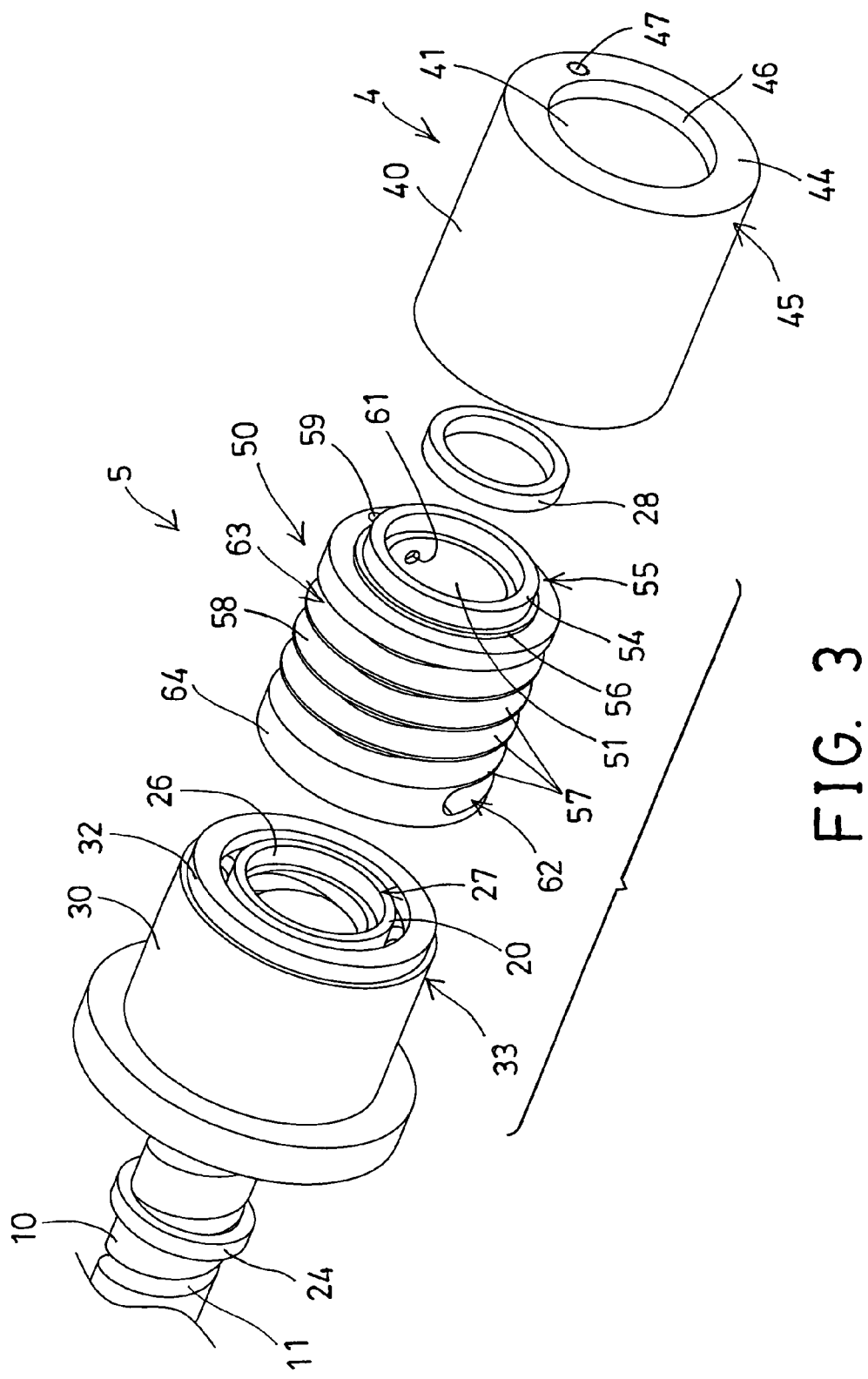
FIG. 3 is a partial exploded view of the ball screw device.
Figure 5:
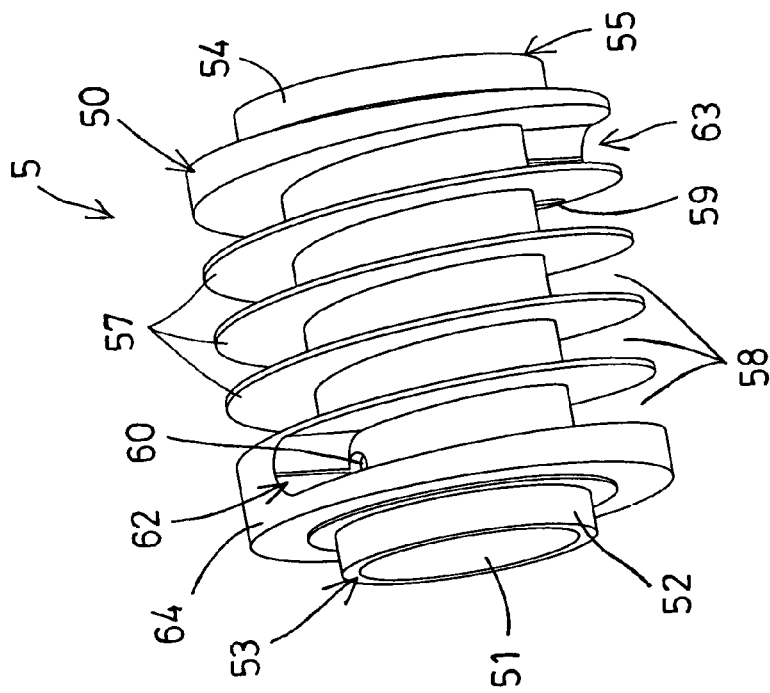
FIG. 5 is a perspective view illustrating an oil actuating or propelling member of the ball screw device.
Figure 4:
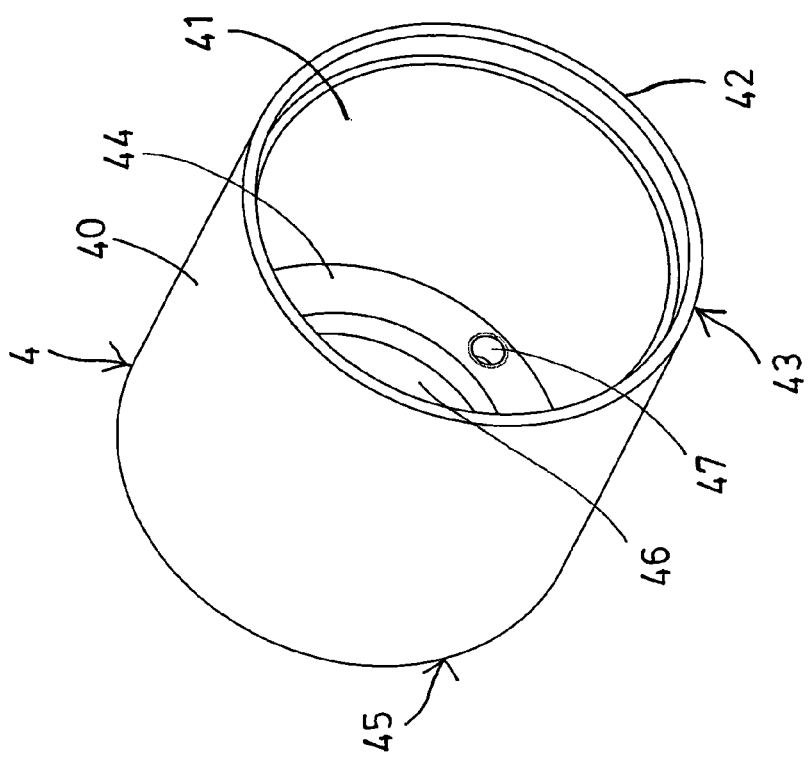
FIG. 4 is a perspective view illustrating an outer bearing housing of the ball screw device.

Referring to the drawings, and initially to FIGS. 1-3, a ball screw device 1 in accordance with the present invention comprises a screw shaft 10 including an outer thread 11 formed on the outer peripheral portion thereof, and a ball nut 20 including a bore 21 formed therein for receiving the screw shaft 10 and including an inner thread 22 formed in the ball nut 20 for aligning with the outer thread 11 of the screw shaft 10 and for forming a multiple turn, helical raceway 12 between the ball nut 20 and the screw shaft 10, and for rotatably and/or movably receiving one or more groups of balls or rollers or rolling or ball bearing members 23 therein which may facilitate the rotating movement of the ball nut 20 relative to the screw shaft 10 when the screw shaft 10 is forced to rotate relative to the ball nut 20 or when the ball nut 20 is forced to rotate relative to the screw shaft 10.

A ball screw seal 24 is attached to one end or outer end 25 of the ball nut 20 and engaged between the ball nut 20 and the screw shaft 10, and engaged with the outer thread 11 of the screw shaft 10 for making a fluid tight seal between the ball nut 20 and the screw shaft 10 and for sealingly receiving and retaining a lubricating oil in a gap 14 that is formed between the ball nut 20 and the screw shaft 10, and thus for suitably lubricating the ball bearing members 23 in order to reduce the friction between the ball nut 20 and the screw shaft 10, and thus for further facilitating the relative movement between the ball nut 20 and the screw shaft 10. The ball nut 20 further includes an inner peripheral recess 26 formed in the other end or inner end 27 of the ball nut 20, distal to the ball screw seal 24 or located farther away from the ball screw seal 24.

An outer bearing housing 30 is further provided and rotatably engaged onto the outer peripheral portion of the ball nut 20, and a number of rolling elements 31 are engaged between the ball nut 20 and the bearing housing 30 for facilitating the rotating movement between the ball nut 20 and the bearing housing 30 and for allowing the ball nut 20 to be smoothly rotated and moved relative to the bearing housing 30. The threading engagement and/or the rotational engagement between the ball nut 20 and the screw shaft 10, and the rotational engagement of the rolling elements 31 between the ball nut 20 and the bearing housing 30 are also typical and will not be described in further details. One example of the ball nut 20 and the screw shaft 10 and the ball screw seal 24 and the bearing housing 30 has been disclosed in U.S. Pat. No. 5,809,838 to Miyaguchi et al. which may be taken as a reference for the present invention.

The bearing housing 30 includes an outer peripheral recess 32 formed therein, such as formed in the outer peripheral portion of the bearing housing 30 at one end or inner end 33 of the bearing housing 30. A lubricating structure or device 4 is further provided and attached to the inner ends 27, 33 of the ball nut 20 and the bearing housing 30 for forcing and supplying the lubricating oil into the gap 14 that is formed between the ball nut 20 and the screw shaft 10, and for suitably lubricating the ball bearing members 23. For example, the lubricating device 4 includes a receptacle 40 having a chamber 41 formed therein for rotatably and/or movably receiving the screw shaft 10, and having a peripheral flange 42 formed in one end portion 43 of the receptacle 40 and engaged with the outer peripheral recess 32 of the bearing housing 30 for securing to the bearing housing 30.

For example, the peripheral flange 42 of the receptacle 40 may be secured to the bearing housing 30 with such as fasteners or latches (not shown), force-fitted engagements, adhesive materials, or by welding processes for allowing the receptacle 40 and the bearing housing 30 to be moved in concert with each other. The receptacle 40 includes a peripheral fence 44 extended therefrom, such as extended from the other end 45 of the receptacle 40 and extended into the chamber 41 of the receptacle 40 for forming an opening 46 in the peripheral fence 44 which includes an inner diameter smaller than that of the chamber 41 of the receptacle 40, and includes an orifice 47 formed in the peripheral fence 44 and communicating with the chamber 41 of the receptacle 40 for receiving or attaching or engaging with a nozzle or grease nipple 48 and for allowing the lubricating oil to be suitably filled into the chamber 41 of the receptacle 40 with the grease nipple 48.

A propelling or forcing means or device 5 is further provided and includes a cylindrical member or barrel 50 having a bore 51 formed therein for rotatably receiving and engaging onto the outer peripheral portion of the screw shaft 10 and having an inner diameter greater than the outer diameter of the screw shaft 10 for forming a gap 16 between the barrel 50 and the screw shaft 10, and includes a peripheral element 52 formed in one end portion 53 of the barrel 50 and engaged with the inner peripheral recess 26 of the ball nut 20 for securing to the ball nut 20 with such as fasteners or latches (not shown), force-fitted engagements, adhesive materials, or by welding processes for allowing the barrel 50 and the ball nut 20 to be moved in concert with each other, and includes a peripheral member 54 extended from the other end 55 of the barrel 50 for rotatably and snugly engaging into the opening 46 of the receptacle 40.

Another ball screw seal 28 is attached to the other end 55 of the barrel 50 and engaged between the barrel 50 and the screw shaft 10, and engaged with the outer thread 11 of the screw shaft 10 for making a fluid tight seal between the barrel 50 and the screw shaft 10 and for sealingly receiving and retaining the lubricating oil in the gap 16 that is formed between the barrel 50 and the screw shaft 10 and that is communicating with the gap 14 formed between the ball nut 20 and the screw shaft 10, and thus for suitably lubricating the ball bearing members 23 in order to reduce the friction between the ball nut 20 and the screw shaft 10, and thus for further facilitating the relative movement between the ball nut 20 and the screw shaft 10. The barrel 50 includes a peripheral spacer 56 extended from the other end 55 of the barrel 50 and/or located between the barrel 50 and the peripheral member 54 of the barrel 50 for engaging with the peripheral fence 44 of the receptacle 40.

As best shown in FIG. 2, an annular space 49 may be formed between the peripheral fence 44 of the receptacle 40 and the barrel 50 and communicating with the orifice 47 of the peripheral fence 44 of the receptacle 40 for receiving the lubricating oil from the grease nipple 48. The barrel 50 further includes a screw or helical member 57 formed on the outer peripheral portion thereof for forming a helical channel 58 in the outer peripheral portion thereof, and includes an entrance 59 formed in the other end 55 of the barrel 50 and communicating with the helical channel 58 of the barrel 50 and the annular space 49 formed between the peripheral fence 44 of the receptacle 40 and the barrel 50, and for allowing the lubricating oil to flow from the grease nipple 48 and the annular space 49 into the helical channel 58 of the barrel 50.

The barrel 50 further includes two apertures 60, 61 formed in the two end portions 62, 63 of the helical channel 58 of the barrel 50 and communicating with the helical channel 58 of the barrel 50 and the gap 16 that is formed between the barrel 50 and the screw shaft 10, and thus for allowing the lubricating oil to flow from the helical channel 58 of the barrel 50 into the gap 16 that is formed between the barrel 50 and the screw shaft 10, and also for allowing the lubricating oil to flow from the gap 16 that is formed between the barrel 50 and the screw shaft 10 into the helical channel 58 of the barrel 50 again, or for allowing the lubricating oil to circulate through the helical channel 58 of the barrel 50 and the gap 16 that is formed between the barrel 50 and the screw shaft 10.

In operation, as shown in FIG. 2, the lubricating oil may be filled or injected or forced into the grease nipple 48 and then into the annular space 49 between the peripheral fence 44 of the receptacle 40 and the barrel 50, and then into the entrance 59 and into the helical channel 58 of the barrel 50, and then may be filled or injected or forced into the gap 16 that is formed between the barrel 50 and the screw shaft 10, and also into the gap 14 formed between the ball nut 20 and the screw shaft 10, and thus for suitably lubricating the ball bearing members 23 in order to reduce the friction between the ball nut 20 and the screw shaft 10. It is to be noted that the lubricating oil received in the helical channel 58 of the barrel 50 may be propelled or forced by the helical member 57 to flow through the apertures 60, 61 of the barrel 50 and to flow or to circulate between the helical channel 58 of the barrel 50 and the gap 16 that is formed between the barrel 50 and the screw shaft 10, in order to suitably lubricate the ball bearing members 23.

It is preferable that the barrel 50 further includes a smooth or cylindrical outer peripheral surface 64 for snugly contacting or engaging with the inner peripheral surface of the receptacle 40 which may close the helical channel 58 of the barrel 50 for suitably contained and retained the lubricating oil within the helical channel 58 of the barrel 50, and for allowing the lubricating oil to be suitably propelled or forced by the helical member 57 to flow through the apertures 60, 61 of the barrel 50 and to flow or to circulate between the helical channel 58 of the barrel 50 and the gap 16 that is formed between the barrel 50 and the screw shaft 10. The typical ball screw devices failed to provide an oil propelling or actuating or forcing means or device 5 for actuating or propelling or forcing the lubricating oil to flow and to circulate between the helical channel 58 of the barrel 50 and the gap 16 that is formed between the barrel 50 and the screw shaft 10 and to suitably lubricate the ball bearing members 23.

Accordingly, the ball screw device in accordance with the present invention includes a lubricating device or structure for effectively and easily lubricating the balls or the bearing members, and for facilitating the rotational movement of the ball nut and the screw shaft relative to each other in great rotational speeds.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:
1. A ball screw device comprising:
a screw shaft including an outer thread formed thereon,
a ball nut including a bore formed therein for receiving said screw shaft and for forming a first gap between said ball nut and said screw shaft and for receiving a lubricating oil, and including an inner thread formed in said ball nut and aligned with said outer thread of said screw shaft for forming a helical raceway between said ball nut and said screw shaft,
a plurality of bearing members engaged in said helical raceway that is formed between said ball nut and said screw shaft for facilitating a movement between said ball nut and said screw shaft,
a barrel attached to said ball nut and moved in concert with said ball nut for forming a second gap between said barrel and said screw shaft and for communicating with said first gap formed between said ball nut and said screw shaft, said barrel including at least one aperture formed therein and communicating with said second gap formed between said barrel and said screw shaft for allowing the lubricating oil to flow into said second gap formed between said barrel and said screw shaft and said first gap formed between said ball nut and said screw shaft, said barrel including an outer peripheral portion having a helical channel formed therein for receiving the lubricating oil, said at least one aperture being communicating with said helical channel of said barrel,
a receptacle rotatably engaged onto said barrel for closing said helical channel of said barrel and for retaining the lubricating oil within said helical channel of said barrel,
a bearing housing rotatably engaged onto said ball nut and attached to said receptacle, and
a plurality of rolling elements engaged between said ball nut and said bearing housing for facilitating a rotating movement between said ball nut and said bearing housing.

2. The ball screw device as claimed in claim 1, wherein said barrel includes a spacer for engaging with said receptacle and for forming an annular space between said receptacle and said barrel, and said barrel includes an entrance communicating with said annular space and said helical channel of said barrel.

3. The ball screw device as claimed in claim 2, wherein said receptacle includes a peripheral fence extended therefrom for forming said annular space between said peripheral fence of said receptacle and said barrel, and for forming an opening in said peripheral fence.

4. The ball screw device as claimed in claim 3, wherein said receptacle includes an orifice formed in said peripheral fence for attaching a grease nipple and for filling the lubricating oil into said receptacle.

5. The ball screw device as claimed in claim 3, wherein said barrel includes a peripheral member extended therefrom for rotatably engaging into said opening of said receptacle.

6. The ball screw device as claimed in claim 1, wherein a ball screw seal is attached to said barrel and engaged with said outer thread of said screw shaft for making a fluid tight seal between said barrel and said screw shaft.

7. The ball screw device as claimed in claim 1, wherein a ball screw seal is attached to said ball nut and engaged with said outer thread of said screw shaft for making a fluid tight seal between said ball nut and said screw shaft.

* * * * *